United States Patent
Wolff et al.

(10) Patent No.: US 11,257,310 B2
(45) Date of Patent: Feb. 22, 2022

(54) FUNCTION MODULE FOR AN ELECTRONIC ACCESS CONTROL

(71) Applicant: Murrelektronik GmbH, Oppenweiler (DE)

(72) Inventors: Ingo Wolff, Oehringen (DE); Bastian Baier, Murr (DE)

(73) Assignee: Murrelektronik GmbH, Oppenweiler (DE)

(*) Notice: Subject to any disclaimer, the term of this patent is extended or adjusted under 35 U.S.C. 154(b) by 397 days.

(21) Appl. No.: 16/291,240

(22) Filed: Mar. 4, 2019

(65) Prior Publication Data

US 2019/0272693 A1 Sep. 5, 2019

(30) Foreign Application Priority Data

Mar. 3, 2018 (DE) .......................... 102018001702.9

(51) Int. Cl.
| | |
|---|---|
| G07C 9/00 | (2020.01) |
| G06F 21/86 | (2013.01) |
| G06F 21/85 | (2013.01) |
| G06F 21/62 | (2013.01) |
| G07C 9/27 | (2020.01) |
| G07C 9/28 | (2020.01) |
| H05K 5/02 | (2006.01) |
| G06F 13/40 | (2006.01) |

(52) U.S. Cl.
CPC ..... *G07C 9/00182* (2013.01); *G06F 13/4068* (2013.01); *G06F 21/62* (2013.01); *G06F 21/85* (2013.01); *G06F 21/86* (2013.01); *G07C 9/00896* (2013.01); *G07C 9/27* (2020.01); *G07C 9/28* (2020.01); *H05K 5/0208* (2013.01); *H05K 5/0273* (2013.01)

(58) Field of Classification Search
CPC .. G07C 9/00182; G07C 9/27; G07C 9/00896; G06F 21/86
See application file for complete search history.

(56) References Cited

U.S. PATENT DOCUMENTS

| 7,779,266 B2 | 8/2010 | Su |
| 8,549,619 B2 | 10/2013 | Bumpus et al. |
| 9,583,929 B1 * | 2/2017 | Moss .......................... H02J 3/00 |

FOREIGN PATENT DOCUMENTS

| EP | 1720281 A1 | 11/2006 |
| JP | H0546539 A | 2/1993 |

OTHER PUBLICATIONS

"RackView Door", ip.com Journal, ip.com Inc., West Henrietta, NY, US, May 31, 2013, XP013157526, ISSN: 1533-0001, pp. 1 to 3.

* cited by examiner

*Primary Examiner* — Daniell L Negron
(74) *Attorney, Agent, or Firm* — Walter Ottesen, P.A.

(57) ABSTRACT

The disclosure relates to a function module for an electronic access control to a housing in electrical equipment. Electronic built-in modules are arranged in the housing. At least one of the built-in modules is connected to a data bus, wherein the built-in module is accessible via an interface and the data bus for the exchange of data. A switchable blocking module is provided according to the invention between the interface and the data bus, wherein the blocking module in a disable state restricts or interrupts the data traffic on the data bus at least for a data exchange between the interface and the built-in module, and in an enable state enables the data bus for an unrestricted exchange of data between the interface and the built-in module.

16 Claims, 2 Drawing Sheets

FUNCTION MODULE FOR AN ELECTRONIC ACCESS CONTROL

CROSS REFERENCE TO RELATED APPLICATION

This application claims priority of German patent application no. 10 2018 001 702.9, filed Mar. 3, 2018, the entire content of which is incorporated herein by reference.

FIELD OF THE INVENTION

The invention relates to a function module for an electronic access control to a housing for electrical equipment, wherein electronic built-in modules such as control modules, monitoring modules, switching modules or the like are arranged in the housing. The built-in modules are connected to a common data bus, wherein a built-in module is connected to an interface over the data bus. The built-in module is accessible through the interface for the exchange of data.

BACKGROUND OF THE INVENTION

A large number of built-in modules that are to be serviced electronically by corresponding data processing programs are installed in known housings, in particular in the case of switch cabinets in electrical installations and the like. Data access to the individual built-in modules is possible via an interface in order, for example, to update an individual built-in module and/or to call up, change or delete data. Firmware updates are, moreover, in most cases necessary for built-in modules with microprocessors in order, for example, to fix bugs, security loopholes or the like.

For data access, for example, to a switch cabinet, it must be opened, for which purpose the operating person must carry a mechanical key. It is disadvantageous that the operating person must—when servicing a plurality of switch cabinets—often keep various mechanical keys ready. In addition, an opening of the switch cabinet is usually not recorded, and there is therefore a possibility of manipulations.

SUMMARY OF THE INVENTION

It is an object of the invention to provide an access control system with various security levels for industrial use, with which a secure authentication and recording of a service person accessing the switch cabinet is possible.

The object is achieved with a function module wherein a blocking module is provided between the interface and the data bus which, when the blocking module is in a disable state, restricts or interrupts the traffic on the data bus and, when the blocking module is in an enable state, enables the data bus for a preferably unrestricted data exchange between the interface and the built-in module.

For an access to the housing and/or for a data access to the built-in modules in the housing, the service person must thus switch the blocking module into the enable state. This is done via a control unit that actuates the blocking module which is configured as a switch, in particular as an electronic switch. The blocking module is connected for this purpose via a control line to the control unit. The control unit is advantageously configured such that it only actuates the switching module after checking an authentication such as, for example, an access code, and its verification. The service person can thus only access the switch cabinet after authentication and/or after verification of an access code. The function module is advantageously configured as a common structural unit together with the control unit and the blocking module.

The control unit in particular includes a microprocessor that controls the communication to and from the control unit and verifies the authentications that are communicated. Such microprocessors store respective work records on the basis of which it is possible to establish which service person, at what time, to what extent and over what period of time had access to the housing or its built-in modules.

It is provided in a preferred form of embodiment that the control unit provides the authentication such as, for example, an access code, over a network. For this purpose the control unit is connected to the network, which can take place wirelessly or—preferably through the interface—via cable. After input of the necessary access data at an in particular mobile PC, the control unit expediently communicates with the web server for authentication. After verification of the received authentication, the control unit enables the blocking module. An in particular unrestricted communication between the interface and the built-in modules is enabled.

In an embodiment, the control unit is connected with at least one reading device for an authentication such as an access code. This reading device can be a card reading device, an RFID reading device, an NFC reading device or a similar reading device. The function of a reading device can be a component of the described invention.

It can also be advantageous for the control unit to be connected to a keyswitch. The keyswitch serves for the authentication, wherein, after actuation of the keyswitch, the control unit switches the blocking module into the enable state.

In a further embodiment, it is provided that the control unit is connected via a control line to an electromechanical locking apparatus for a door of the housing. A mechanical access control for the manual access to the built-in modules in the housing can in this way also be provided through the function module, so that a mechanical access is only opened to particular, qualified service persons.

It can be provided that the interface is provided inside the housing and/or outside the housing. An external interface can be provided in a wall of the housing, preferably in a side wall of the housing. This is made possible in a simple manner through the installation of appropriate built-in sockets, accessible from outside, such as SUB-D, RJ45, USB or similar sockets.

In a further embodiment, it is expediently provided that the enable state and/or the disable state of the blocking module is indicated by an in particular visual display.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
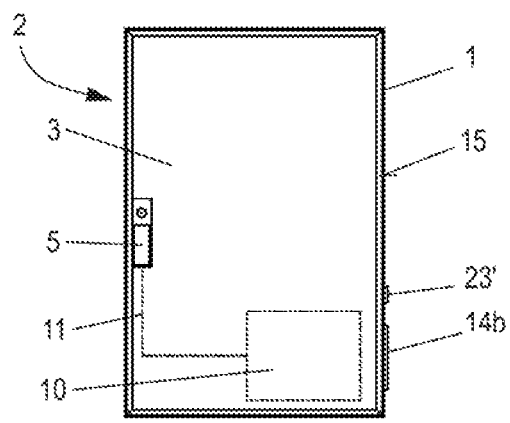
FIG. 1 shows a schematic illustration of a housing for holding built-in modules taking a switch cabinet as an example.

A housing 1, which in the embodiment shown is a switch cabinet 2, is shown schematically in FIG. 1. Switch cabinets 2 of this sort are used in electrical engineering for the installation of electrical equipment and the like in order to arrange built-in electronic modules 6 with different structures therein, and to wire them electrically. The built-in modules 6 can consist of one or a plurality of control modules 8, monitoring modules 9, switching modules 12 and the like, or similar modules. The built-in modules 6 are configured for an access to data.

The switch cabinet according to FIG. 1 includes an access opening 4 (FIG. 2) closed by a door 3. The door 3 is provided with a locking apparatus 5 in order to lock the switch cabinet 2 mechanically after the door 3 has been closed. In the embodiment shown, the locking apparatus 5 is configured as an electromechanical locking apparatus. The electromechanical locking apparatus 5 is operated by a control line 11, which connects the locking apparatus 5 to a function module 10 for an access control, in particular with a control unit 22 (FIG. 2).

Figure 2:
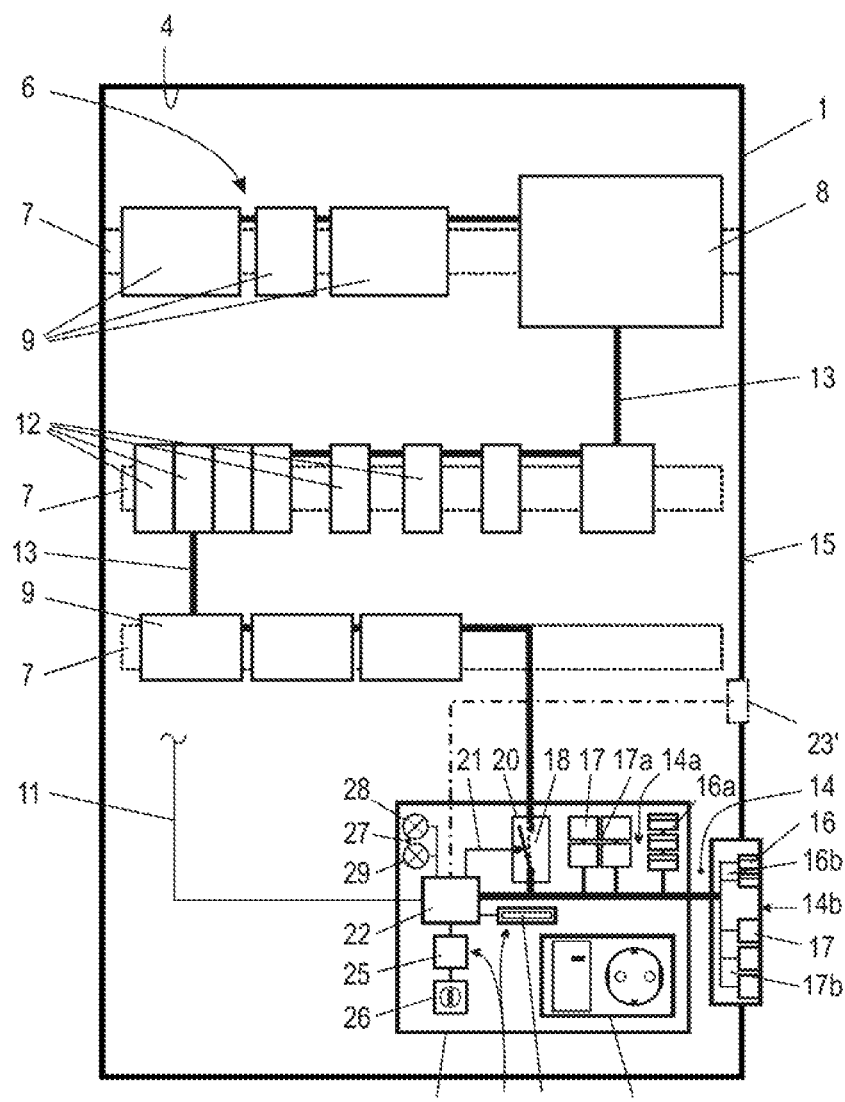
FIG. 2 shows an enlarged view of a schematic illustration of the interior of the housing shown in FIG. 1 with built-in modules and the function module arranged therein; and, FIG. 3 shows an enlarged view of a schematic illustration of a further embodiment of the function module.

The opened housing 1 with the access opening 4 is shown schematically in FIG. 2. Support rails 7 are fastened to the rear wall of the housing 1. The support rails 7 serve, in a manner known per se, to hold built-in modules 6 such as, for example, control modules 8, monitoring modules 9, switching modules 12 and the like. The built-in modules 6, which in the embodiment are the control module 8, the monitoring modules 9 and the switching modules 12, are connected together via an, in particular common, data bus 13. The data bus 13 connects an interface 14 to the built-in modules 6, and enables a communication of each individual built-in module with the interface 14.

The interface 14 can be arranged as an internal interface 14a within the housing 1. The internal interface 14a is only accessible after opening the housing 1. Expediently, it can be an external interface 14b which—as suggested in FIGS. 1 and 2—can be provided in a side wall 15 of the housing 1, for example. The external interface 14b is accessible from the outside when the housing 1 is closed.

The interfaces 14 can be configured as USB interfaces, as RJ45 interfaces, as sub-D interfaces, or the like. In the embodiment shown, USB interfaces 16a and 16b are provided both for the internal interface 14a as well as for the external interface 14b. The USB interfaces 16a, 16b are implemented as a USB socket 16, known per se.

The internal interface 14a and/or the external interface 14b can further include RJ45 interfaces 17a and 17b. Advantageously the RJ45 interfaces 17a and 17b are implemented as RJ45 sockets 17.

Fundamentally, a single USB socket 16 or a single RJ45 socket 17 is sufficient as an internal interface 14a and/or external interface 14b. In the embodiment shown, the internal interface 14a has four RJ45 interfaces 17a and three USB interfaces 16a. The external interface includes two USB interfaces 16b and three RJ45 interfaces 17b.

In the embodiment shown, both an internal interface 14a and also an external interface 14b are provided. It can be sufficient to provide only one internal interface 14a or external interface 14b.

The built-in modules 6 of the housing 1 are connected via the data bus 13 to the interface 14. A blocking module 20 is provided between the interface 14 and the data bus 13. The blocking module 20 is implemented as a switch 18 in the embodiment shown, in particularly as an electronic switch.

Figure 3:
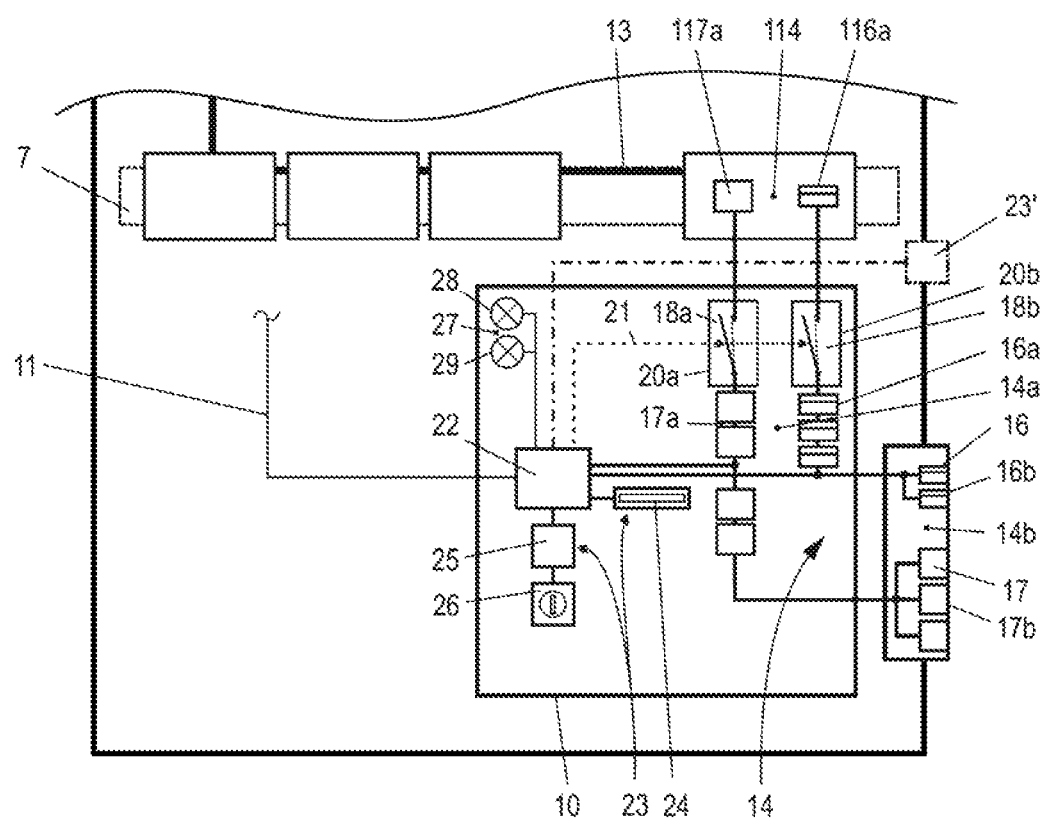

In the embodiments shown according to FIGS. 2 and 3, the blocking modules 20, 20a and 20b are shown in the disable state. In the disable state, the switch 18, 18a, 18b is open, so that data exchange between the interface 14 and one or a plurality of the built-in modules 6 is interrupted. In the disable state of the blocking module 20, no data exchange is possible via the interface 14 with the built-in modules 6. The blocking module is in the disable state when not powered, so that data access to the built-in module 6 is blocked in the event of a power failure.

The blocking module 20 is controlled via a control line 21 from a control unit 22 in order to change the switch state. The control unit 22 is advantageously configured to check an authentication such as, for example, an access code.

The authentication, made by way of example in the form of an access code, can be provided to the control unit 22 via a network connection, in particular a LAN connection. A LAN connection can be established in an easy manner via an external or internal RJ45 socket 17.

It is preferably provided that a data access to the control unit 22 is enabled via the internal interface 14a and/or the external interface 14b independently of the switch state of the blocking module 20. In this way it is possible—both in the disable state of the blocking module 20 as well as in the enable state of the blocking module 20—for the control unit 22 to communicate with a web server via a wired or wireless network connection. If the web server—after the input of access data by a service person—communicates a valid authentication to the control unit 22, this will close the switch 18 and transfer the blocking module 20 into the enable state. The enable state of the blocking module 20 is suggested in FIG. 2 by the dashed line.

Thus if the control unit 22 receives a valid authentication, for example an access code, the blocking module 20 is actuated via the control line 21; the switch 18 changes from the disable state into the enable state, which is suggested by the dashed line. In the enable state, the data bus 13 is connected to the interface 14, so that data exchange is possible between the interface 14 and one or a plurality of the built-in modules 6. A service device, for example, a laptop or the like, connected via the interface 14 can call up, change or delete the data of the built-in module 6, and/or update the microprocessor installed in a built-in-module with firmware and/or call up stored log data.

In addition to transmitting an authentication via a network connection to the control unit 22, the authentication can, also or alternatively, be transmitted via a reading device 23 of the control unit 22. The control unit 22 is connected for this purpose with at least one reading device 23. The reading device can be a card reading device 24 and/or an RFID reading device 25. Other types of reading device, for example, an NFC (Near Field Communication) reading device are also expedient.

In a simple form of embodiment, the control unit 22 can be connected to a keyswitch 26 which—through closing one or a plurality of contacts—outputs a corresponding authentication to the control unit 22.

It can be expedient to indicate the switch state of the blocking module 20, for which purpose a display 27 can be provided. In the embodiment shown, a visible display from a state indicator for the switch state of the switch 18 is provided. A first LED 28 can thus signal the disable state and a second LED 29 the enable state of the blocking module 20.

The internal interface 14a and/or the external interface 14b, the blocking module 20, the control unit 22 with the reading device 23 and/or the keyswitch 26, as well as the display 27, are preferably arranged in a common function module 10 which is to be built into the housing 1 or the switch cabinet 2. Since all the elements necessary for the function are arranged in the function module 10 in a common construction unit, the function module 10 can be built into a housing, switch cabinet or the like without a high wiring effort. The function module 10 is, in particular, suitable for retrofitting to existing switch cabinets 2.

The control unit 22 can, further, unlock the electromechanical locking apparatus 5 of the door 3 of the switch cabinet 2 via the control line 11. To open the switch cabinet 2, a service person connects a service device (mobile PC or the like) via an external interface 14b, and communicates with the control unit 22 which is accessible via a data connection, independently of the switch state of the blocking module 20. After transmitting a valid authentication, the control unit 22 unlocks the locking apparatus 5, so that the switch cabinet 2 opens and all the built-in modules 6 are mechanically freely accessible for a service.

In order to be able to actuate the blocking module 20 without opening the switch cabinet 2, a reading device 23', which can be configured, for example, as an RFID reading device, NFC reading device or similar contactless reading device, can be arranged, for example in the side wall 15 of the housing. A service person establishes a connection to the external interface 14b via a service device, for example, a PC, and identifies themselves to the reading device 23' via a corresponding chip or similar identifying element. The control unit 22—after verifying a valid authentication—will transfer the blocking module 20 into the enable state; the service person can carry out necessary service work without opening the switch cabinet 2.

In the embodiment according to FIG. 2, the data bus 13 is itself connected to the interface 14 via the blocking module 20. In the embodiment according to FIG. 3, the data bus 13 leads to one or a plurality of fixed interfaces 114, as shown in FIG. 3. These interfaces can, for example, be an RJ45 interface 117a or a USB interface 116a.

In the embodiment according to FIG. 2, a mains connection 30 for the supply of voltage to a service device, for example, a mobile PC, is furthermore provided. The mains connection 30—expediently together with a safety device—is in particular integrated into the function module 10.

The function module 10 according to FIG. 3 is configured in such a way that the RJ45 interface 117a can be connected via a first blocking module 20a to the internal interface 17a, while the USB interface 116a is connected via a blocking module 20b to the internal USB interface 16a. According to FIG. 2, the interface 14 provided is either an internal interface 14a and/or an external interface 14b. Both the internal RJ45 interface 17a and also the external RJ45 interface 17b are connected via a data line directly to the control unit 22, so that—independent of the switch state of the blocking module 20a—a direct data access to the control unit 22 is provided both via the internal RJ45 interface 17a as well as via the external RJ45 interface 17b.

Accordingly the internal USB interface 16a and/or the external USB interface 16b are connected—in particular via separate data lines—to the control unit 22, independently of the switch state of the blocking module 20b.

The rest of the structure of the function module 10 corresponds to that of FIG. 2, for which reason the same reference signs are used for the same parts.

In the embodiment according to FIG. 3, the internal RJ45 interface 17a and/or the external RJ45 interface 17b can be activated separately from an activation of the USB interfaces 16a, 16b. An activation of the internal USB interface 16a and of the external USB interface 16b is accordingly possible, independently of the RJ45 interfaces 17a and 17b.

The function module 10 according to FIG. 3 is in particular advantageous as a retrofitting set for existing switch cabinets. It can also be expedient to permit a restricted data access to the control unit through the interface. Independently of the disable state or the enable state of the blocking module, at least the electromechanical locking of the door of the housing can be operated.

It is understood that the foregoing description is that of the preferred embodiments of the invention and that various changes and modifications may be made thereto without departing from the spirit and scope of the invention as defined in the appended claims.

What is claimed is:

1. A function module for an electronic access control to a housing in electrical systems, wherein a plurality of electronic built-in modules are arranged in the housing, wherein at least one of the plurality of built-in modules is connected to a data bus and to an interface via the data bus, wherein the at least one of the plurality of built-in modules is accessible via the interface for the exchange of data, the function module comprising:
 a blocking module disposed between the interface and the data bus;
 said blocking module having a disable state and an enable state, wherein said blocking module, in said disable state, restricts or interrupts data traffic on the data bus at least for a data exchange between the interface and the at least one of the plurality of built-in modules and, in said enable state, enables the data bus for a free exchange of data between the interface and the at least one of the plurality of built-in modules;
 a control unit having a control line;
 said blocking module being controlled by said control line of said control unit; and,
 said control unit being configured to check an authentication.

2. The function module of claim 1, wherein said blocking module is configured as a switch.

3. The function module of claim 2, wherein said switch is an electronic switch.

4. The function module of claim 1, wherein
 said blocking module is controlled by said control line of said control unit, wherein said authentication is provided to said control unit via a network connection.

5. The function module of claim 4, wherein the authentication is provided via a web server.

6. The function module of claim 1 further comprising:
 at least one reading device; and,
 said control unit being connected to said at least one reading device for the authentication.

7. The function module of claim 1 further comprising:
 a reading device; and,
 said control unit being connected to said reading unit.

8. The function module of claim 7, wherein said reading device is a card reading device or an RFID reading device.

9. The function module of claim 1 further comprising a keyswitch, wherein said control unit is connected to said keyswitch.

10. The function module of claim 1, wherein said control unit is connected via a further control line to a locking apparatus for a door of the housing.

11. The function module of claim 1,
 wherein, independently of the disable state or the enable state of said blocking module, at least a limited data access to said control unit is present via the interface.

12. The function module of claim 1, wherein the interface is disposed inside the housing.

13. The function module of claim 1, wherein the interface is accessible from outside the housing.

14. The function module of claim 1, wherein the housing is a switch cabinet.

15. The function module of claim 1 further comprising a visual display, wherein at least one of said enable state and said disable state of said blocking module is indicated by said visual display.

16. The function module of claim 1, wherein the plurality of built-in modules includes at least one of a control module, a monitoring module and a switching module.

\* \* \* \* \*